(12) United States Patent
Thorebäck

(10) Patent No.: US 10,608,338 B2
(45) Date of Patent: Mar. 31, 2020

(54) SIGNAL DISTRIBUTION NETWORK

(71) Applicant: Telefonaktiebolaget LM Ericsson (publ), Stockholm (SE)

(72) Inventor: Johan Thorebäck, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 158 days.

(21) Appl. No.: 15/737,506

(22) PCT Filed: Jun. 24, 2015

(86) PCT No.: PCT/SE2015/050734
§ 371 (c)(1),
(2) Date: Dec. 18, 2017

(87) PCT Pub. No.: WO2016/209127
PCT Pub. Date: Dec. 20, 2016

(65) Prior Publication Data
US 2018/0175500 A1    Jun. 21, 2018

(51) Int. Cl.
*H01Q 3/26* (2006.01)
*H01Q 21/00* (2006.01)
*H01Q 3/40* (2006.01)
*H01Q 3/28* (2006.01)
*H04B 7/06* (2006.01)

(52) U.S. Cl.
CPC ............ *H01Q 3/2605* (2013.01); *H01Q 3/26* (2013.01); *H01Q 3/28* (2013.01); *H01Q 3/40* (2013.01); *H01Q 21/0006* (2013.01); *H04B 7/0617* (2013.01)

(58) Field of Classification Search
CPC ...... H01Q 3/26; H01Q 3/2605; H01Q 3/2658; H01Q 3/28; H01Q 3/40; H01Q 21/0006; H04B 7/0617

USPC ......................................................... 342/372
See application file for complete search history.

(56) References Cited

U.S. PATENT DOCUMENTS

2006/0208944 A1    9/2006  Haskell

FOREIGN PATENT DOCUMENTS

| CN | 101578737 A | 11/2009 |
|---|---|---|
| CN | 103891152 A | 6/2014 |
| DE | 69126291 T2 | 1/1998 |

(Continued)

OTHER PUBLICATIONS

First Office Action, Chinese Application No. 201580081169.7, dated Jan. 9, 2020, 8 pages.

*Primary Examiner* — Dao L Phan
(74) *Attorney, Agent, or Firm* — Sage Patent Group

(57) ABSTRACT

There is provided a signal distribution network for an antenna arrangement with fewer input ports than antenna elements. The signal distribution network comprises at least two signal splitters. The signal distribution network comprises at least one signal combiner. Each signal splitter is configured to receive one input baseband signal from a unique input port and to provide one direct feed signal as input to a unique antenna element, and to provide one intermediate signal as input to at least one of said at least one signal combiner. Each signal combiner is configured to receive two intermediate signals, each intermediate signal being received from a respective signal splitter of the at least two signal splitters, and to provide one combined signal as input to a unique antenna element, wherein the one combined signal is formed by combining the received two intermediate signals.

20 Claims, 16 Drawing Sheets

(56) References Cited

FOREIGN PATENT DOCUMENTS

| WO | 2008056127 A1 | 5/2008 |
|----|---------------|--------|
| WO | 2012097862 A1 | 7/2012 |
| WO | 2012162985 A1 | 12/2012 |
| WO | 2015152782 A1 | 10/2015 |

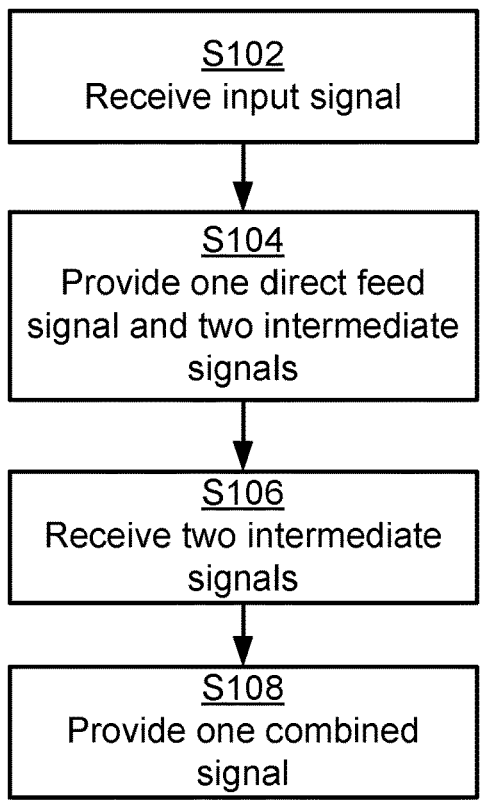
Fig. 14
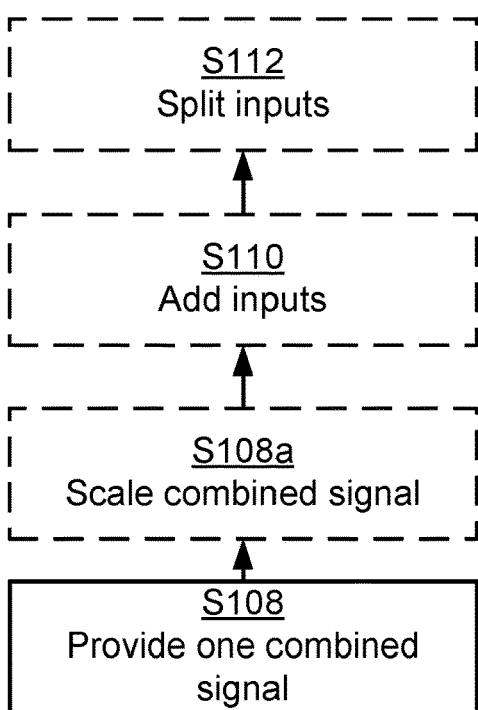
Fig. 15
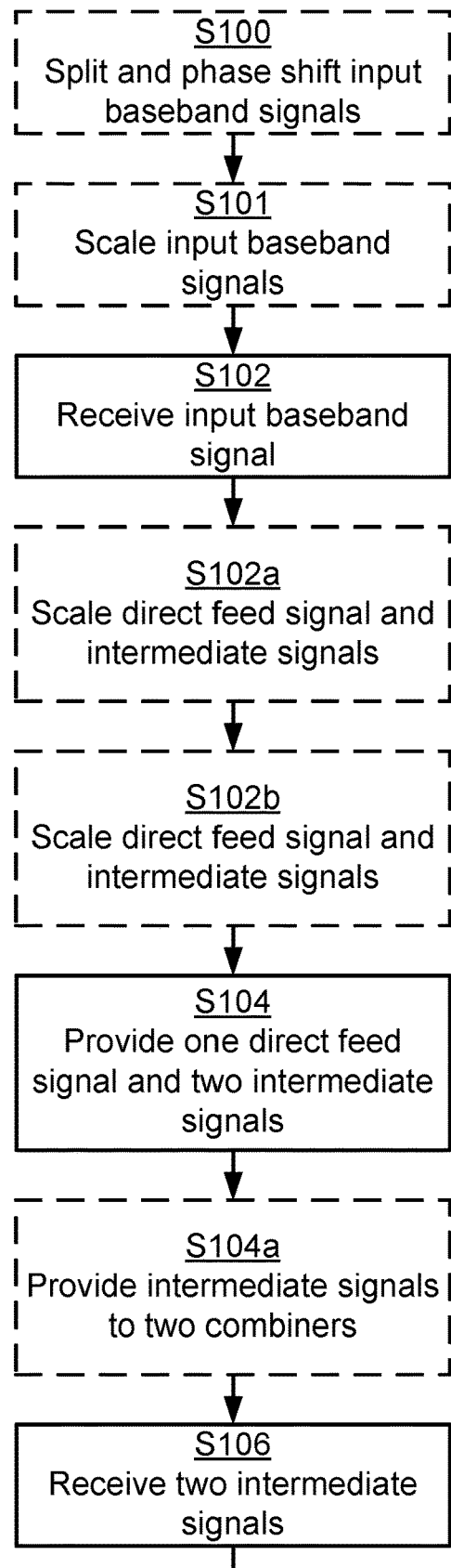

SIGNAL DISTRIBUTION NETWORK

TECHNICAL FIELD

Embodiments presented herein relate to a signal distribution network for an antenna arrangement with fewer input ports than antenna elements, and to a method, and a computer program product for processing signals in a signal distribution network for an antenna arrangement with fewer input ports than antenna elements.

BACKGROUND

In communications networks, it may be challenging to obtain good performance and capacity for a given communications protocol, its parameters and the physical environment in which the communications network is deployed.

One component of wireless communications networks where it may be challenging to obtain good performance and capacity is the antennas. For example, in order to perform beam-forming (such as beam-width and beam-pointing control) of one or multiple antenna beams/lobes towards desired directions for array antennas, the amplitude and relative phase of the individual signals feeding the individual antenna ports needs to be controlled.

Such control may be enabled by generating individual electrical signals from individual digital signals, in which case the required phase shift is performed in the digital domain. This is referred to as digital beam-forming.

Alternatively, the individual electrical signals may be generated from a common analogue signal, which is split to the desired number of individual signals needed, followed by individual phase-shift in the analogue domain. This is referred to as analogue beam-forming.

Another option for analogue beam-forming is to use different forms of signal distribution networks. One commonly used implementation is the use of the so-called Butler matrix. In such implementations the signal splitting and phase-shifting is performed in the Butler matrix. Such an implementation may generally also require some additional signal switches in order to perform the selection of different beam directions.

There are also beam-forming architectures that use combinations of analogue and digital phase-shifting; e.g., using digital phase-shifting to control the beam in azimuth (sideways) and analogue phase-shifting to control the beam in elevation.

As the skilled person understands, the above disclosed means for beam-forming have their particular benefits and limitations. In general terms, digital beam-forming may be considered flexible and may support multiple simultaneous beams, but the implementation may be complicated as it requires individual signal conversion between the digital and the analogue domains. Analogue beam-forming may be advantageous from the perspective that it relies on analogue signal processing, which does not need to involve multiple instances of data converters (digital-to-analog converters and analog-to-digital converters) and/or up/down converters. Analogue beam-forming is commonly less complex than digital beam-forming, but to meet the required phase-accuracy might require a delicate and careful design. Another limitation for analogue beam-forming is that analogue beam-forming inherently only supports a single beam. Providing multiple beams may thus require multiple instances of phase-shifters or, for implementations based on using the Butler matrix, ways to connect multiple analogue signals to multiple inputs of the Butler matrix.

Hence, there is still a need for improved distribution networks for antenna arrangements.

SUMMARY

An object of embodiments herein is to provide an efficient distribution network for antenna arrangements.

According to a first aspect there is presented a signal distribution network for an antenna arrangement with fewer input ports than antenna elements. The signal distribution network comprises at least two signal splitters. The signal distribution network comprises at least one signal combiner. Each signal splitter is configured to receive one input baseband signal from a unique input port and to provide one direct feed signal as input to a unique antenna element, and to provide one intermediate signal as input to at least one of said at least one signal combiner. Each signal combiner is configured to receive two intermediate signals, each intermediate signal being received from a respective signal splitter of the at least two signal splitters, and to provide one combined signal as input to a unique antenna element, wherein the one combined signal is formed by combining the received two intermediate signals.

Advantageously this provides an efficient distribution network for antenna arrangements.

Advantageously this provides an efficient distribution network for antenna arrangements in terms of implementation, size, complexity, power-consumption, cost, and/or versatility, or at least a compromise considering all these kinds of terms.

Advantageously, this provides an distribution network to be operatively connected between a (digital) transceiver and the array of antenna elements with a reduced number of transceiver ports compared to the number of antenna elements or antenna element ports.

This is advantageous as the distribution network takes advantage of analogue splitting of one or a few signals, to a higher number of signals while still maintaining the advantages of a digital beam-forming architecture; multiple antenna lobes can be supported and freely placed in a given subspace without restrictions. By digitally controlling the generation of a few signal components and feeding these to the analogue signal distribution network according to the invention, the complexity (e.g., size, weight, power consumption, etc.) of a fully individual digital beam-forming architecture can be avoided.

According to a second aspect there is presented a network node comprising a signal distribution network according to the first aspect.

According to a third aspect there is presented a wireless terminal comprising a signal distribution network according to the first aspect.

According to a fourth aspect there is presented a method for processing signals in a signal distribution network for an antenna arrangement with fewer input ports than antenna elements. The signal distribution network comprises at least two signal splitters and at least one signal combiner. The method comprises receiving, by each signal splitter, one input baseband signal from a unique input port. The method comprises providing, by each signal splitter, one direct feed signal as input to a unique antenna element, and providing one intermediate signal as input to at least one of said at least one signal combiner. The method comprises receiving, by each signal combiner, two intermediate signals, each intermediate signal being received from a respective signal splitter of the at least two signal splitters. The method comprises providing, by each signal combiner, one combined signal as input to a unique antenna element, wherein the one combined signal is formed by combining the received two intermediate signals.

According to a fifth aspect there is presented a computer program for processing signals in a signal distribution network for an antenna arrangement with fewer input ports than antenna elements, the computer program comprising computer program code which, when run on a signal distribution network, causes the signal distribution network to perform a method according to the fourth aspect.

According to a sixth aspect there is presented a computer program product comprising a computer program according to the third aspect and a computer readable means on which the computer program is stored.

It is to be noted that any feature of the first, second, third, fourth, fifth, and sixth aspects may be applied to any other aspect, wherever appropriate. Likewise, any advantage of the first aspect may equally apply to the second, third, fourth, fifth, and/or sixth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIGS. 14 and 15 are flowcharts of methods according to embodiments; and

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any method step illustrated by dashed lines should be regarded as optional.

As noted above, an object of embodiments herein is to provide an efficient distribution network for antenna arrangements.

Further, in view of the issues listed above, it may be desirable to provide a distribution network for antenna arrangements that enables the number of digital transmitters to be decreased whilst still having the benefit of being able to generate and control multiple lobes from the same antenna array, that enables generation of relative phase-shift between signal components to multiple antenna elements (or sub-arrays) by a combination of digitally generated signals and an analog distribution/combination network, and/or that supports multiple antenna lobes from the same antenna array and corresponding hardware.

At least some of the embodiments disclosed herein make use of the fact that combining two or more coherent signals by creating vector sums and vector differences can be a way to generate signal components over large antenna arrays. This might be useful when considering that a high number of antenna elements is often needed to generate high antenna gain. At the same time there are requirements on adjustable antenna lobes, ranging from simple vertical tilt to more advanced beam pointing functions. Generating these beam-forming functions in the digital domain may provide more flexibility and capabilities than traditional analogue solutions, for example enabling different frequency carriers in the same frequency band to be controlled individually in order to generate multiple simultaneous beams.

Figure 1:
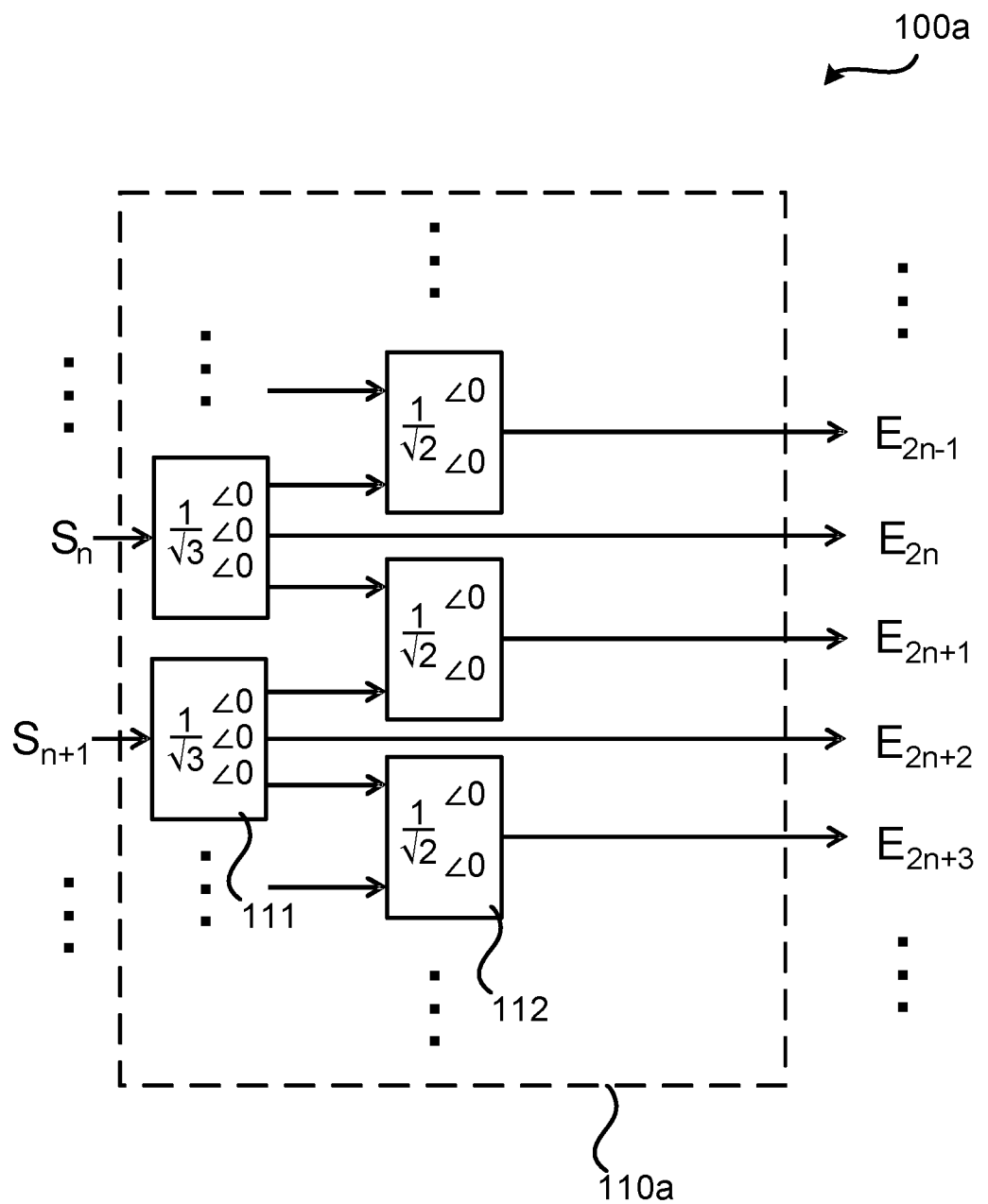
FIGS. 1, 2, 4, 6, 7, 8, 9, 10, and 11 are schematic diagrams of signal distribution networks for antenna arrangements according to embodiments.

At least some of the embodiments disclosed herein relate to a signal distribution network for an antenna arrangement with fewer input ports than antenna elements. Reference is now made to FIG. 1 illustrating a signal distribution network 110a for an antenna arrangement 100a according to an embodiment. The signal distribution network 110a comprises at least two signal splitters 111 and at least one signal combiner 112.

At each splitter 111, baseband input signals S1, S2, . . . are split into three equal components (having identical amplitude and phase). FIG. 4 schematically shows how each of the two three-way splitters 111 are configured to serve one output antenna element port E1, E2, . . . but also two different signal combiners 112 each. As will be described in further detail below, particularly with references to FIGS. 3 and 5, at each combiner 112 all adjacent baseband input signals are combined in pairs to generate an approximate interpolated new signal vector. Each combiner 112 is thus configured to pairwise combine signals from two adjacent splitters 11 to create interpolated values of the original input signals S. These interpolated values are fed to output antenna element ports.

The signal distribution network 100a can be described as an infinite ladder of three-way splitters 111 and two-to-one combiners 112. There are at least two different options available for truncating this infinite ladder of three-way splitters 111 and two-to-one combiners 112. As will be further disclosed below, one option is to omit one of the three outputs from the first and the last signal splitters;

another option is to generate a specific difference signal from the first signal combiner and then combining this signal to the unpaired output signal from the three-way combiner (see, for example FIG. 4 and the description thereof).

The general mechanism to derive signals to additional antenna ports from a smaller set of input ports, as defined by baseband input signals S1, S2, . . . is to split every input signal in three, where only one of these three identical components are fed directly to the output antenna elements ports E1, E2, . . . . The other two copies of the input baseband signals are combined with the neighboring input baseband signals, which will create new vectors. These vectors can under some conditions be good approximations of intermediate vectors that according to prior art would have been needed at the input side, i.e., where E1 is given by S1, where E2 is given by S2, etc.

Properties of the signal splitters will now be disclosed. Each signal splitter is configured to receive one input baseband signal from a unique input port and to provide one direct feed signal as input to a unique antenna element. Each signal splitter is further configured to provide one intermediate signal as input to at least one of the signal combiner.

Properties of each signal combiner will now be disclosed. Each signal combiner is configured to receive two intermediate signals. Each intermediate signal is received from a respective signal splitter of the at least two signal splitters. Each signal combiner is configured to provide one combined signal as input to a unique antenna element. The combined signal is formed by combining the received two intermediate signals.

Each two-way signal splitter (i.e., a signal splitter having one input and two outputs) may be provided by a Wilkinson 2-way combiner/splitter.

Each three-way signal splitter (i.e., a signal splitter having one input and three outputs) may be provided by a Wilkinson 3-way combiner/splitter.

Each two-way signal combiner (i.e., a signal combiner having two inputs and one output) may be provided by a Wilkinson 2-way combiner/splitter, or a branch-line 90-degree hybrid coupler with and added 90-degree phase shifter, a rate-race 180-degree hybrid coupler, or a similar type of hybrid coupler.

Further optional properties and features of the signal distribution network will be provided below.

Input signals to the signal distribution network may be regarded as analogue radio frequency (RF) signals, which in turn may be generated from (unique) digital baseband signals. Exactly how the input signals are generated is out of the scope of the present disclosure. One advantage of the proposed signal distribution network is to be able to reduce the digital implementation by introducing small and simple analogue RF components, as defined by the at least two signal splitters and the at least one signal combiner.

Advantageously, by combining some constituting signal components in such a fashion a linear (or at least approximately linear) phase front is generated that in turn will form an antenna beam pointing into a specific direction.

Figure 12A:
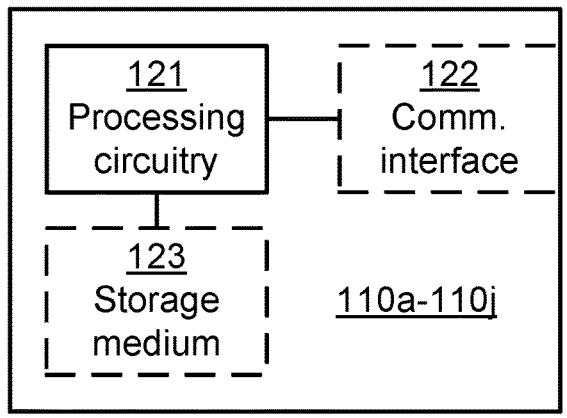
FIG. 12a is a schematic diagram showing functional units of a signal distribution network according to an embodiment.

The signal distribution network will mainly be described in a downlink scenario (from the perspective of the radio access network node) where at least one signal is transmitted by antenna ports and thus where signals first are received from the input ports for being processed by the signal distribution network and then fed to the antenna elements. See, for example, the methods disclosed with references to the flowcharts of FIGS. 14 and 15. Hence, in this scenario signals are described as originating from digital baseband representations and further generated as analogue RF signals which are fed into the signal distribution network comprising splitters and combiners, and finally fed to the antenna elements. However, due to reciprocity, it is possible to reverse the signal flow and will then also be applicable for an uplink scenario (from the perspective of the radio access network node). Hence, the signal distribution network is also applicable to a scenario where signals are received by antenna elements and then processed by the signal distribution network before being fed to the input ports. FIG. 12a schematically illustrates, in terms of a number of functional units, the components of a signal distribution network 110a-110j according to an embodiment. Processing circuitry 121 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 131 (as in FIG. 13), e.g. in the form of a storage medium 123.

Particularly, the processing circuitry 121 is configured to cause the signal distribution network 110a-110j to perform a set of operations, or steps, S100-S112. These operations, or steps, S100-S112 will be disclosed below. For example, the storage medium 123 may store the set of operations, and the processing circuitry 121 may be configured to retrieve the set of operations from the storage medium 123 to cause the signal distribution network 110a-110j to perform the set of operations. The set of operations may be provided as a set of executable instructions.

Thus the processing circuitry 121 is thereby arranged to execute methods as herein disclosed. The storage medium 123 may also comprise persistent storage, which, for example, can be any single one or combination of magnetic memory, optical memory, solid state memory or even remotely mounted memory. The signal distribution network 110a-110j may further comprise a communications interface 122 for communications with other entities and devices, such as an antenna arrangement. As such the communications interface 122 may comprise one or more transmitters and receivers, comprising analogue and digital components. The processing circuitry 121 controls the general operation of the signal distribution network 110a-110j e.g. by sending data and control signals to the communications interface 122 and the storage medium 123, by receiving data and reports from the communications interface 122, and by retrieving data and instructions from the storage medium 123.

Figure 12B:
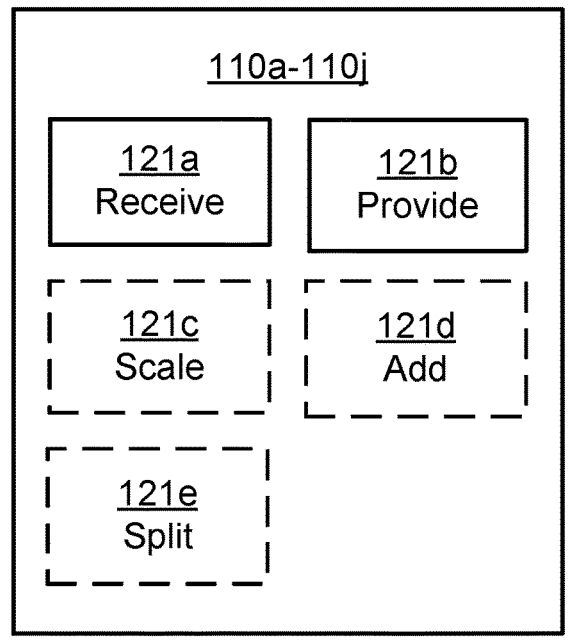
FIG. 12b is a schematic diagram showing functional modules of a signal distribution network according to an embodiment.

FIG. 12b schematically illustrates, in terms of a number of functional modules, the components of a signal distribution network 110a-110j according to an embodiment. The signal distribution network 110a-110j of FIG. 12b comprises a number of functional modules; a receive module 121a configured to perform below steps S102, S106, and a provide module 121b configured to perform below steps S104, S104a, S108. The signal distribution network 110a-110j of FIG. 12b may further comprises a number of optional functional modules, such as any of a scale module 121c configured to perform below steps S101, S102a, S102b, S108a, an add module 121d configured to perform below step S110, and a split (and phase shift) module 121e configured to perform below steps S100, S112. The functionality of each functional module 121a-121e will be further disclosed below in the context of which the functional modules 121a-121e may be used. In general terms, each functional module 121a-121e may be implemented in hardware or in software. Preferably, one or more or all functional modules 121a-121e may be implemented by the processing circuitry 121, possibly in cooperation with functional units 122 and/or 123. The processing circuitry 121 may thus be arranged to from the storage medium 123 fetch instructions as provided by a functional module 121a-121e and to execute these instructions, thereby performing any steps as will be disclosed hereinafter.

The signal distribution network 110a-110j may be provided as a standalone device or as a part of a further device. For example, the signal distribution network 110a-110j may be provided in an antenna arrangement 100a-100j. Hence, an antenna arrangement 100a-100j may comprise a signal distribution network 110a-110j as herein disclosed. The antenna arrangement 100a-100j may be part of a radio access network node (such as a radio base station, a base transceiver station, a nodeB, or an evolved nodeB). The antenna arrangement 100a-100j may additionally or alternatively be part of a wireless devices (such as a mobile station, mobile phone, handset, wireless local loop phone, user equipment (UE), smartphone, laptop computer, tablet computer, or modem).

Figure 12C:
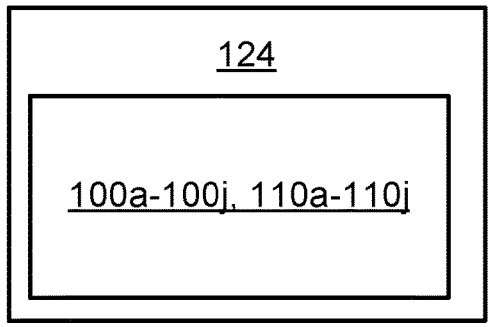
FIG. 12c is a schematic diagram showing a network node comprises a signal distribution network or an antenna arrangement that comprises such a signal distribution network according to embodiments.
Figure 12D:
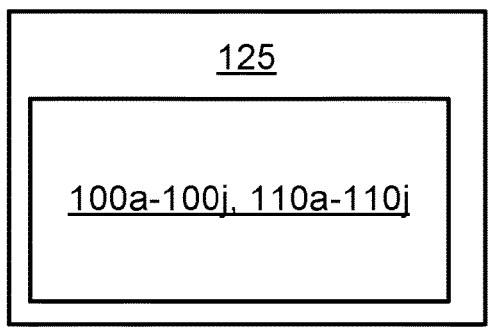
FIG. 12d is a schematic diagram showing a wireless device comprises a signal distribution network or an antenna arrangement that comprises such a signal distribution network according to embodiments.

FIG. 12c schematically illustrates a network node 124 comprising a signal distribution network 110a-110j or antenna arrangement 100a-100j comprising such a signal distribution network 110a-110j. FIG. 12d schematically illustrates a wireless device 125 comprising a signal distribution network 110a-110j or an antenna arrangement 100a-100j comprising such a signal distribution network 120a-110j. The signal distribution network 110a-110j or the antenna arrangement 100a-100j may be provided as an integral part of the network node 124 or the wireless device 125. That is, the components of the signal distribution network 110a-110j or the antenna arrangement 100a-100j may be integrated with other components of the network node 124 or wireless device 125; some components of the network node 124 or wireless device 125 and the signal distribution network 110a-110j or the antenna arrangement 100a-100j may be shared.

Figure 13:
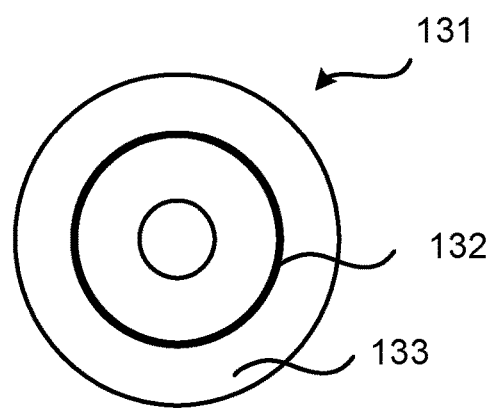
FIG. 13 shows one example of a computer program product comprising computer readable means according to an embodiment.

FIG. 13 shows one example of a computer program product 31 comprising computer readable means 133. On this computer readable means 133, a computer program 132 can be stored, which computer program 132 can cause the processing circuitry 121 and thereto operatively coupled entities and devices, such as the communications interface 122 and the storage medium 123, to execute methods according to embodiments described herein. The computer program 132 and/or computer program product 131 may thus provide means for performing any steps as herein disclosed.

In the example of FIG. 13, the computer program product 131 is illustrated as an optical disc, such as a CD (compact disc) or a DVD (digital versatile disc) or a Blu-Ray disc. The computer program product 131 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 132 is here schematically shown as a track on the depicted optical disk, the computer program 132 can be stored in any way which is suitable for the computer program product 131.

Reference is now made to FIG. 14 illustrating a method for processing signals in a signal distribution network 110a-110j for an antenna arrangement 100a-100j with fewer input ports than antenna elements as performed by the signal distribution network according to an embodiment. The method is advantageously provided as a computer program 132. As noted above, the signal distribution network 110a-110j comprises at least two signal splitters 111 and at least one signal combiner 112.

The signal distribution network is configured to, in a step S102, receive, by each signal splitter, one input baseband signal from a unique input port. The signal distribution network is configured to, in a step S104, provide, by each signal splitter, one direct feed signal as input to a unique antenna element, and to provide one intermediate signal as input to at least one of the at least one signal combiner. The signal distribution network is configured to, in a step S106, receive, by each signal combiner, two intermediate signals, each intermediate signal being received from a respective signal splitter of the at least two signal splitters. The signal distribution network is configured to, in a step S108, providing, by each signal combiner, one combined signal as input to a unique antenna element, wherein the one combined signal is formed by combining the received two intermediate signals.

Reference is now made to FIG. 15 illustrating methods for processing signals in a signal distribution network for an antenna arrangement with fewer input ports than antenna elements as performed by the signal distribution network according to further embodiments. The method is advantageously provided as a computer program 132.

According to some embodiments (e.g., the embodiment of FIGS. 1, 2, 4, 6, 8, 9, 10, 11) each signal splitter is configured to scale the direct feed signal and the intermediate signal with a first energy conservation factor. The signal distribution network may thus be configured to, in a step S102a, scale, by each signal splitter, the direct feed signal and the intermediate signal with a first energy conservation factor.

According to some embodiments (e.g., the embodiment of FIG. 7, 10,) each signal splitter is configured to scale the direct feed signal with one first energy conservation factor and the intermediate signal with another first energy conservation factor. The signal distribution network may thus be configured to, in a step S102b, by each signal splitter, scale the direct feed signal with one first energy conservation factor and the intermediate signal with another first energy conservation factor.

According to some embodiments (e.g., any of the embodiments of FIGS. 1-11) each signal combiner is configured to scale the combined signal with a second energy conservation factor. The signal distribution network may thus be configured to, in a step S108a, scale, by each signal combiner, the combined signal with a second energy conservation factor.

According to some embodiments (e.g., the embodiment of FIGS. 4, 6, 7, 8, 9, 10) each signal combiner is provided as a hybrid coupler having a sum output port and a difference output port. The combined signal may be provided by the sum output port.

According to some embodiments (e.g., any of the embodiments of FIGS. 1-11) the signal distribution network comprises at least two signal combiners. Each signal splitter may be configured to provide intermediate signals as input to two of said at least two signal combiners. The signal distribution network may thus be configured to, in a step S104a, provide, by each signal splitter, intermediate signals as input to two of said at least two signal combiners.

Special care should be taken when treating the outermost signal splitters. By utilizing the fact that the signal combiner can be provided as a 90-degree or 180-degree hybrid coupler, use can be made of not only the sum of the input signals, but also the difference between them. Two ways to realize this is either by using a so-called rat-race combiner or a 90-degree hybrid coupler (e.g. a branch-line hybrid) with additional phase-shifts added. By using the difference port of the 180-degree coupler the additional signal components to the outermost antenna elements (which lies outside the elements driven directly by the input signals S1 and S3 in FIG. 5) can now be estimated. As seen graphically in FIG. 5 the input signal components S1 and S2 are first combined as (a scaled version of) S1-S2 and added to S2 to generate the element component E1. Particularly, according to some embodiments (e.g., the embodiments of FIGS. 4, 6, 7, 8, 9, 10, 11) the signal distribution network further comprises a signal adder 113. The signal adder 113 may be regarded as a signal combiner where the output is its sigma (or sum) port (Σout), see FIG. 4(c). The signal adder is configured to provide input to one antenna element of the antenna arrangement. One of the at least two combiners is configured to provide a first input to the signal adder. One of the at least one combiner is configured to provide a second input to the signal adder. The signal distribution network may thus be configured to, in a step S110, add, by the signal adder, a first input and a second input. According to this embodiment each signal combiner may be provided as a hybrid coupler having a sum output port and a difference output port, and the second input may be provided by the difference output port of said one of the at least one combiner.

According to some embodiments (e.g., the embodiment of FIG. 7) the signal distribution network further comprises an amplitude tapering unit 114. The amplitude tapering unit is configured to scale one input baseband signal and to provide the scaled one input baseband signal to one of the at least two signal splitters. The signal distribution network may thus be configured to, in a step S101, scale, by a amplitude tapering units 114, one input baseband signal and to provide the scaled one input baseband signal to one of the at least two signal splitters.

According to some embodiments (e.g., the embodiment of FIGS. 6, 9, 10) the signal distribution network further comprises a further signal splitter 115. The further signal splitter is configured to split the input to one of the antenna elements into two inputs, and to feed the two inputs to unique antenna elements. The signal distribution network may thus be configured to, in a step S112, by a further signal splitter 115, split the input to one of the antenna elements into two inputs, and to feed the two inputs to unique antenna elements.

According to some embodiments (e.g., any of the embodiments of FIGS. 1-11) there is a linear phase increment between the input baseband signals to adjacent ones of the at least two signal splitters. For example, assume that input baseband signal number i can be written as Si=Ai*exp(jφi), where A is an amplitude factor, j denotes the imaginary unit, φ is an angular offset, and exp denotes the exponential function. Then, for i=1 . . . K−1, where K is the total number of input baseband signals, there is a phase increment between adjacent phase values of φi.

According to some embodiments (e.g., the embodiment of FIG. 11) all input baseband signals come from a common input baseband signal provided by a single transmitter chain 116. The common input baseband signal is split and phase shifted by a unit 119 to define the input baseband signals before the input baseband signals are fed to the at least two signal splitters. The signal distribution network may thus be configured to, in a step S100, by a unit 119, split and phase shift the input baseband signals to define the input baseband signals.

According to some embodiments (e.g., the embodiment of FIGS. 6, 7) each input baseband signal has its own individual transmitter chain 117.

According to some embodiments (e.g., the embodiment of FIG. 2) the signal distribution network is configured to receive N input baseband signals and to provide inputs to 2N−1 antenna elements.

According to some embodiments (e.g., the embodiment of FIGS. 4, 8) the signal distribution network is configured to receive N input baseband signals and to provide inputs to 2N antenna elements.

According to some embodiments (e.g., the embodiment of FIGS. 1, 7, 9, 11) the signal distribution network is configured to receive N input baseband signals and to provide inputs to 2N+1 antenna elements.

Particular embodiments of signal distribution networks for an antenna arrangement with fewer input ports than antenna elements will now be disclosed with references to FIGS. 1-11.

The embodiment of FIG. 1 represents a realization of a signal distribution network 110a in an antenna arrangement 100a where two signal splitters, one of which is identified at reference numeral 111 and three signal combiners, one of which is identified at reference numeral 112 are shown.

Figure 2:
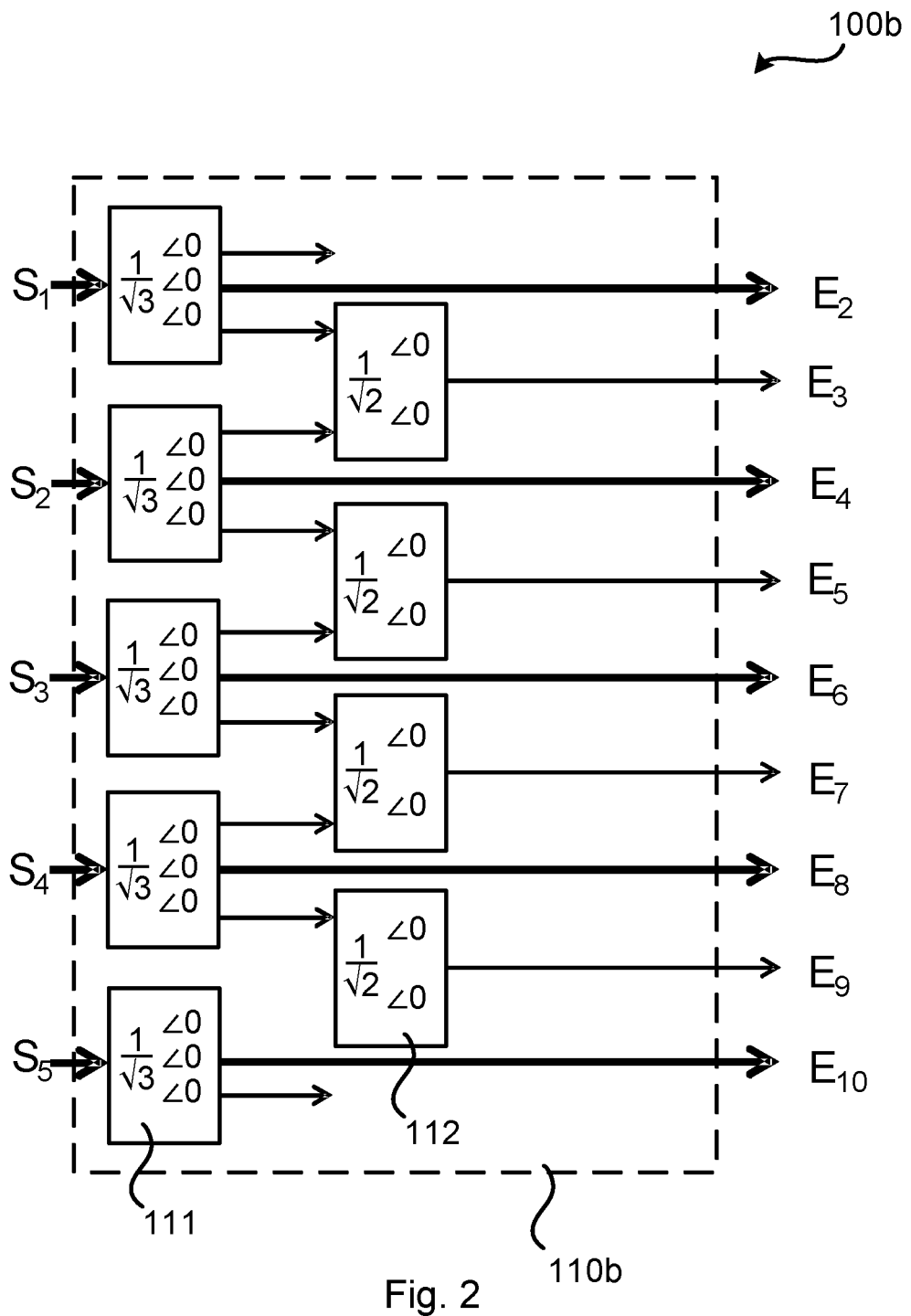

The embodiment of FIG. 2 represents a realization of a signal distribution network 110b in an antenna arrangement 100b with five inputs, as defined by baseband signals S1-S5 and nine antenna ports, as defined by antenna elements E2-E10, and where the signal distribution network 110b comprises five signal splitters 111 and four signal combiners 112.

Figure 3:
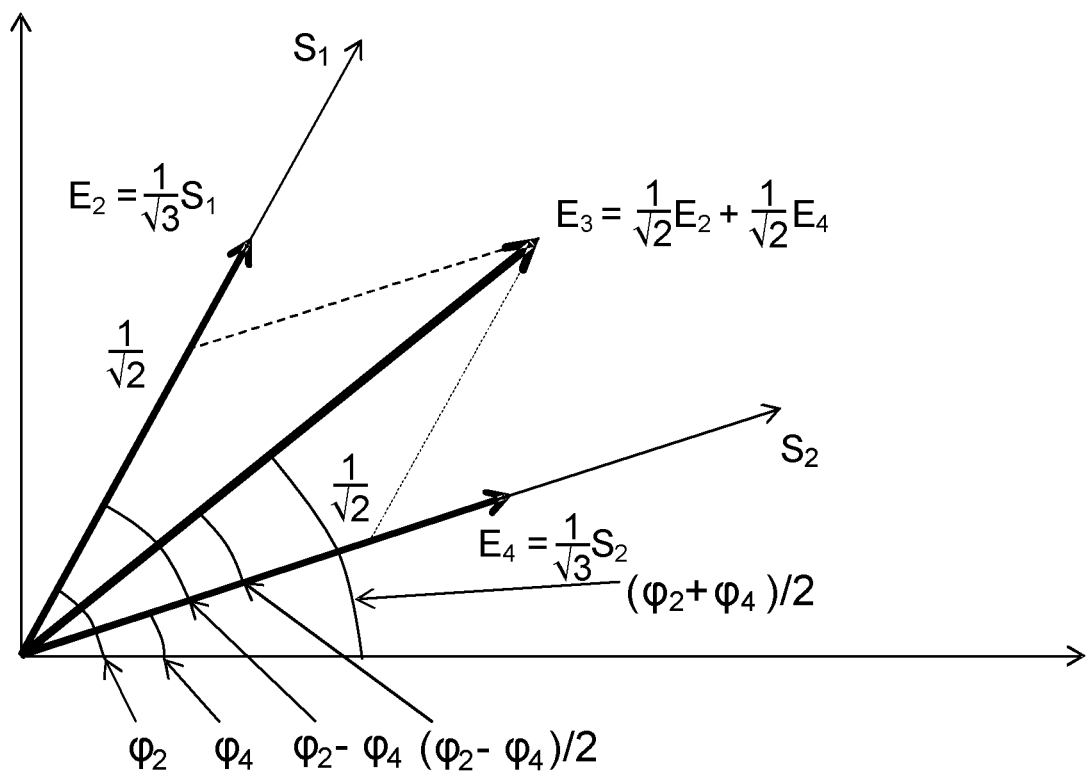
FIGS. 3 and 5 are schematic diagrams showing a signal components analysis for combination mechanisms from signals to signals according to embodiments.
Figure 4:
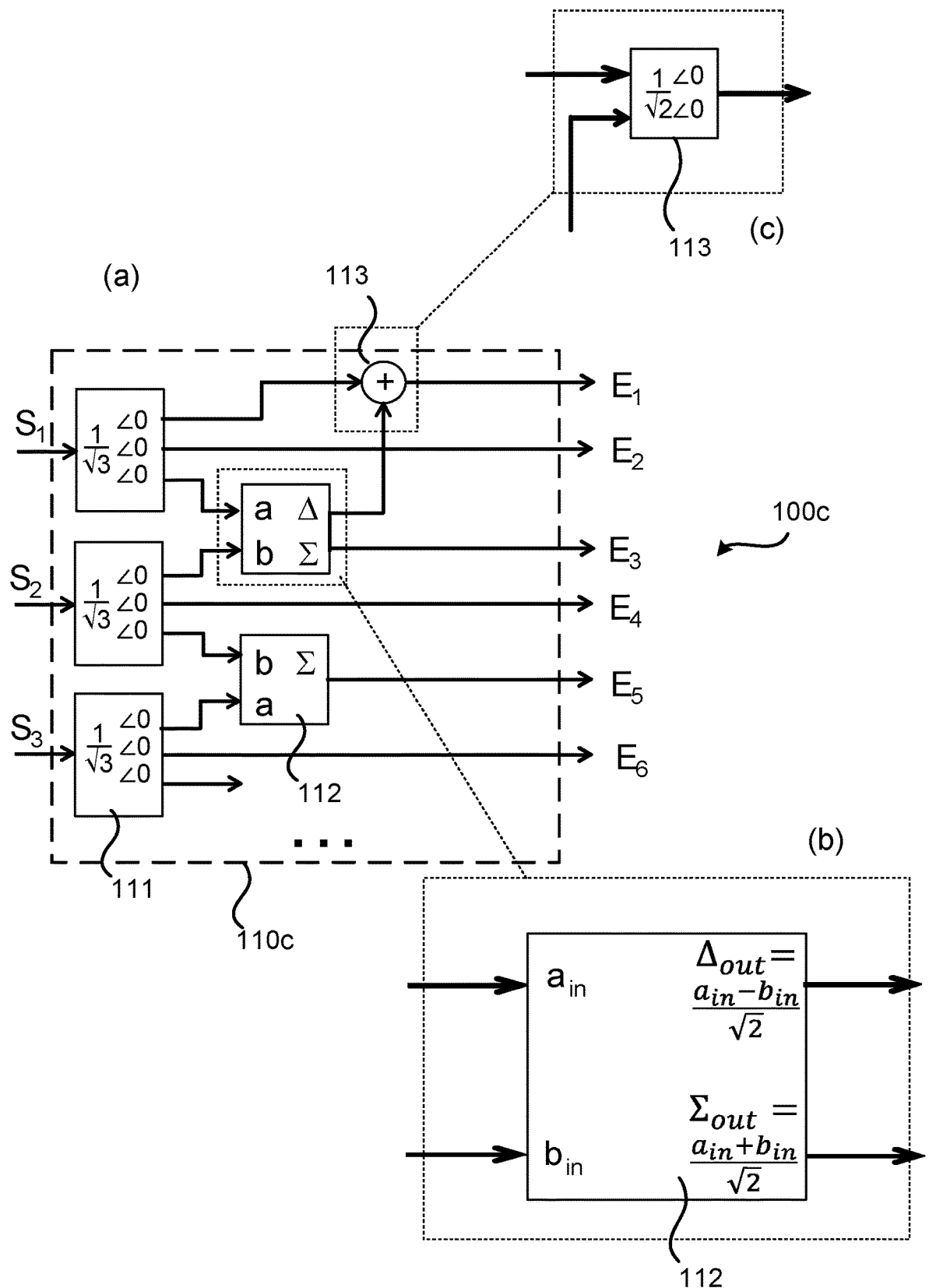

FIG. 3 schematically illustrates a signal components analysis for the combination mechanisms from signals S1-S3 to signals E2 to E4.

The embodiment of FIG. 4(a) represents a realization of a signal distribution network 110c in an antenna arrangement 100c with three inputs, as defined by baseband signals S1-S3 and six antenna ports, as defined by antenna elements E1-E6, and where the signal distribution network 110c comprises three signal splitters 111, two signal combiners 112, and one adder 113. The adder is configured to receive one signal contribution a signal splitter and one signal contribution from a signal combiner. The output from the adder defines the signal contribution to antenna element E1. As seen in more detail in FIG. 4(b), the signal combiner from which the adder 113 receives one signal contribution generates this signal contribution from its delta (or difference) port (Δout). As seen in more detail in FIG. 4(c), the signal adder 113 may be regarded as a signal combiner where the output is its sigma (or sum) port (Σout). Hence, each signal adder 113 as disclosed herein may be implemented by a signal combiner.

Figure 5:
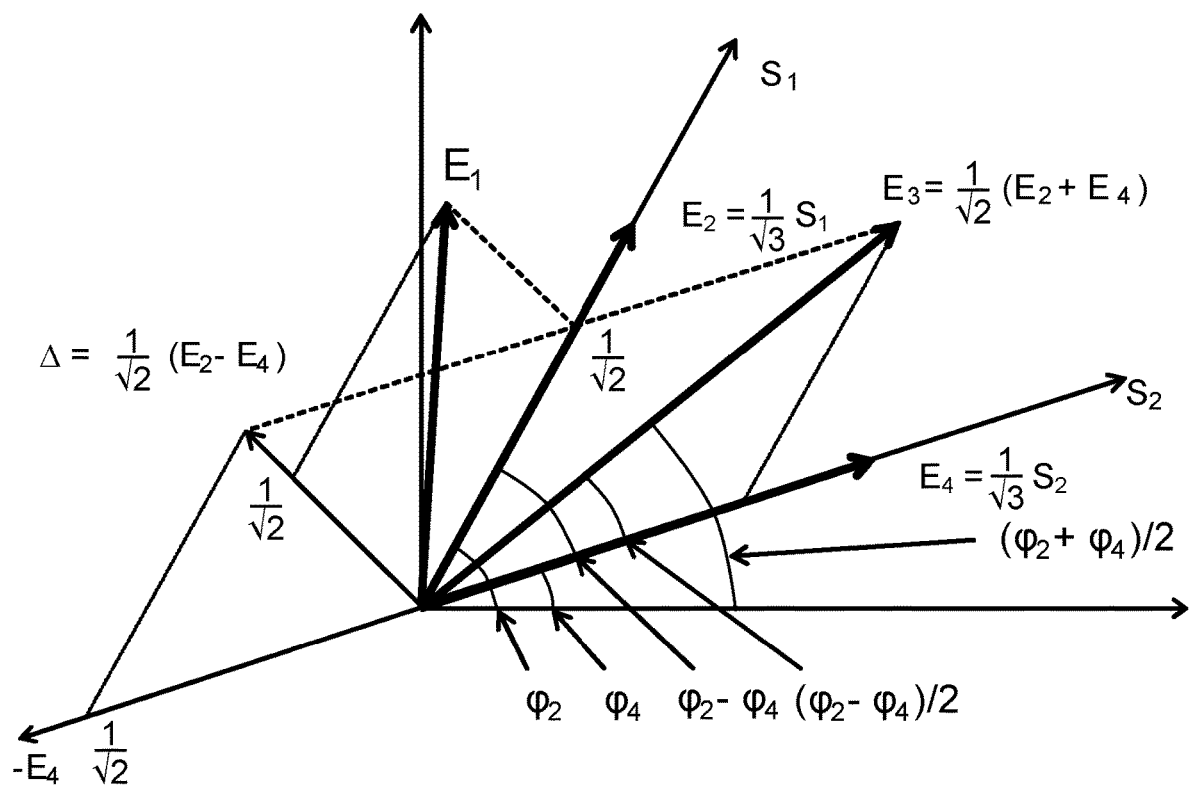

FIG. 5 schematically illustrates a signal components analysis for the combination mechanisms from signals S1-S3 to signals E1 to E4.

Figure 6:
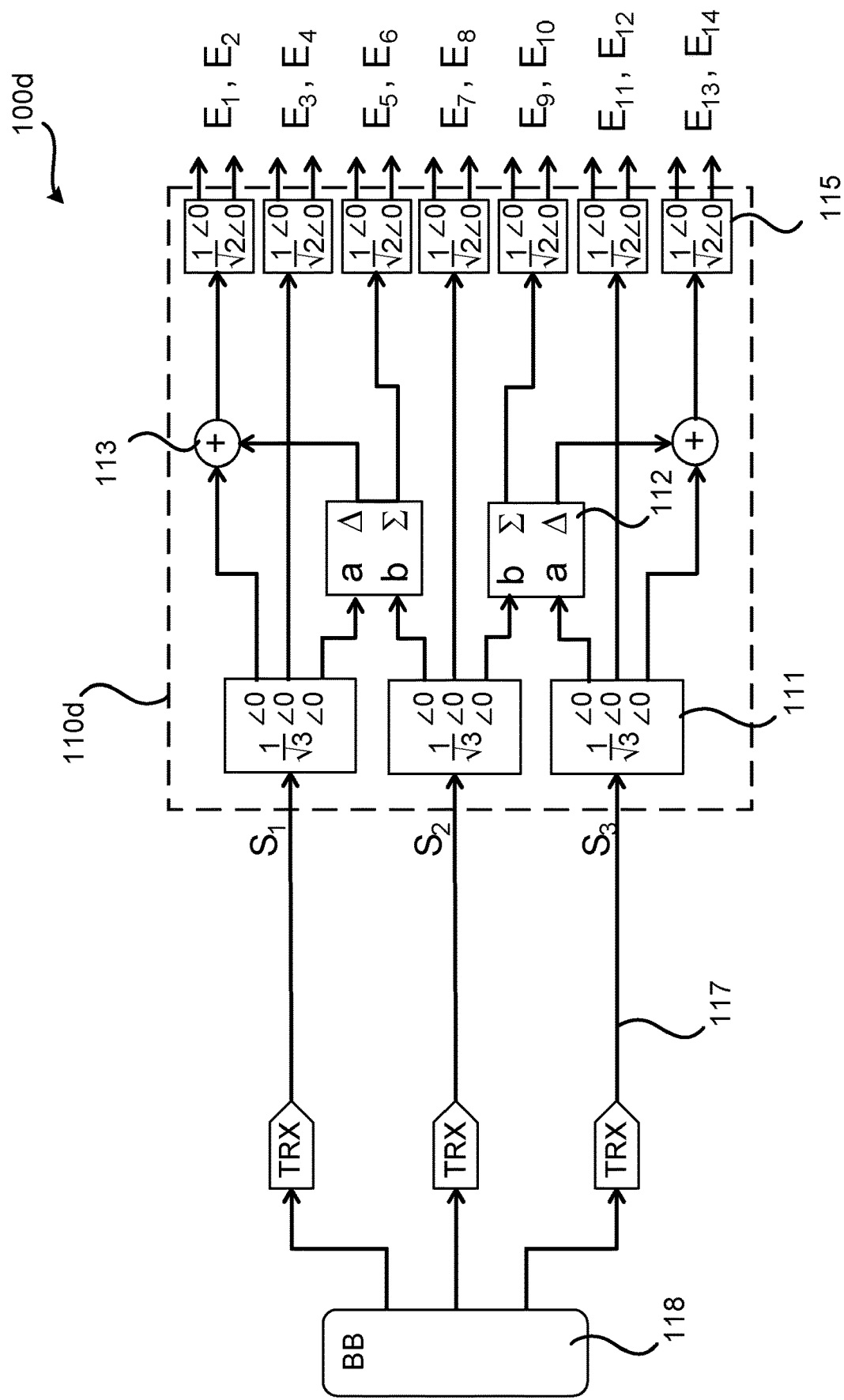

The embodiment of FIG. 6 represents a realization of a signal distribution network 110d in an antenna arrangement 100d having three inputs, as defined by baseband signals S1-S3 and fourteen antenna ports, as defined by antenna elements E1-E14, and where each input baseband signal has its own individual transmitter chain, one of which is identified at reference numeral 117. Each transmitter chain has its own transmitter (TRX). The input baseband signals originate from a baseband block 118. The signal distribution network 110d comprises three signal splitters 111, two signal combiners 112, and two signal adders 113. The signal distribution network 110d further comprises seven further signal splitters, one of which is identified by reference numeral 115.

Figure 7:
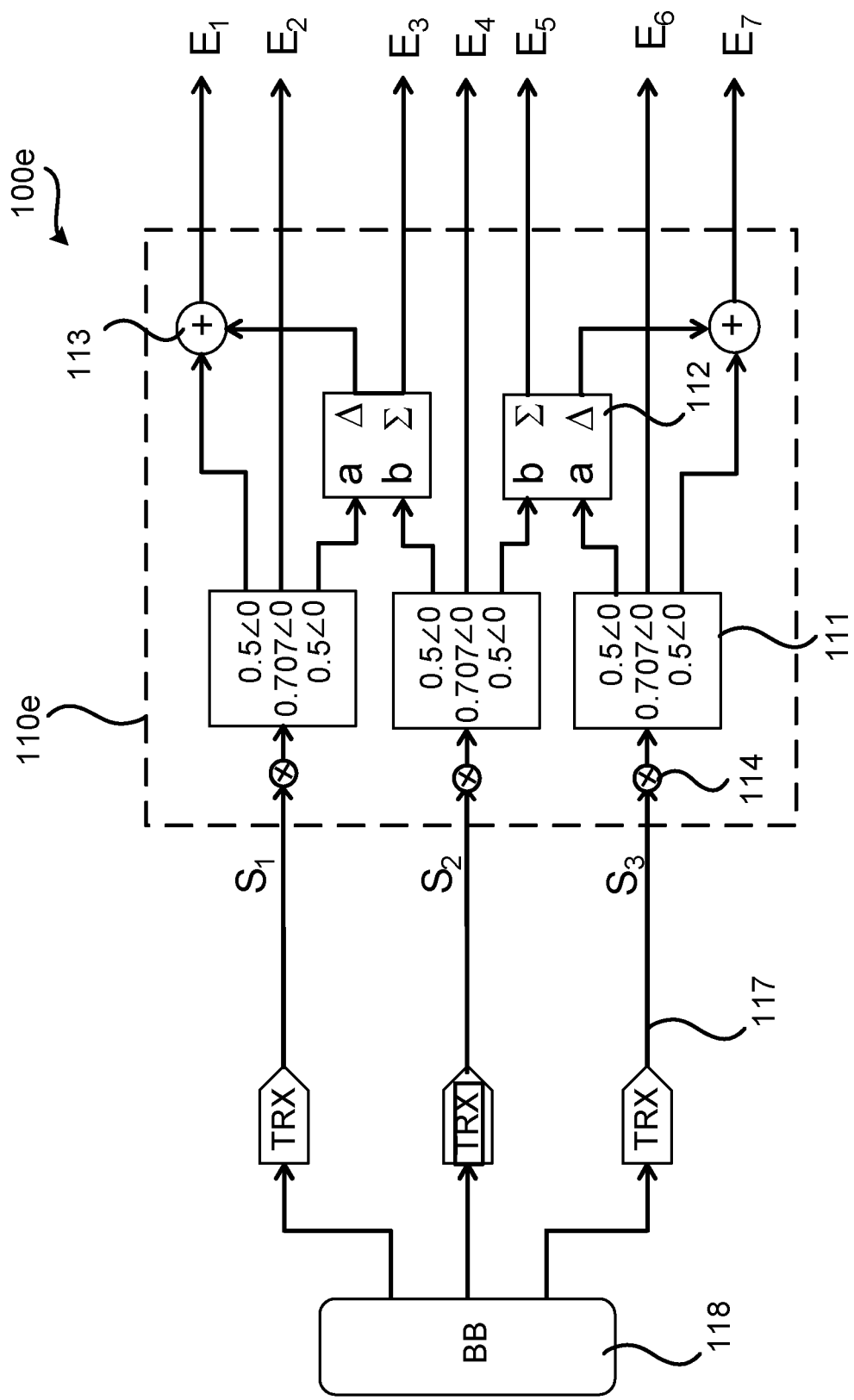

The embodiment of FIG. 7 represents a realization of a signal distribution network 110e in an antenna arrangement woe similar to the signal distribution network 110d of FIG. 6 but without further signal splitters and where the signal splitters 111 comprises amplitude tapering units 114 configured to scale one input baseband signal such that the individual outputs of one signal splitter have different amplitudes.

Figure 8:
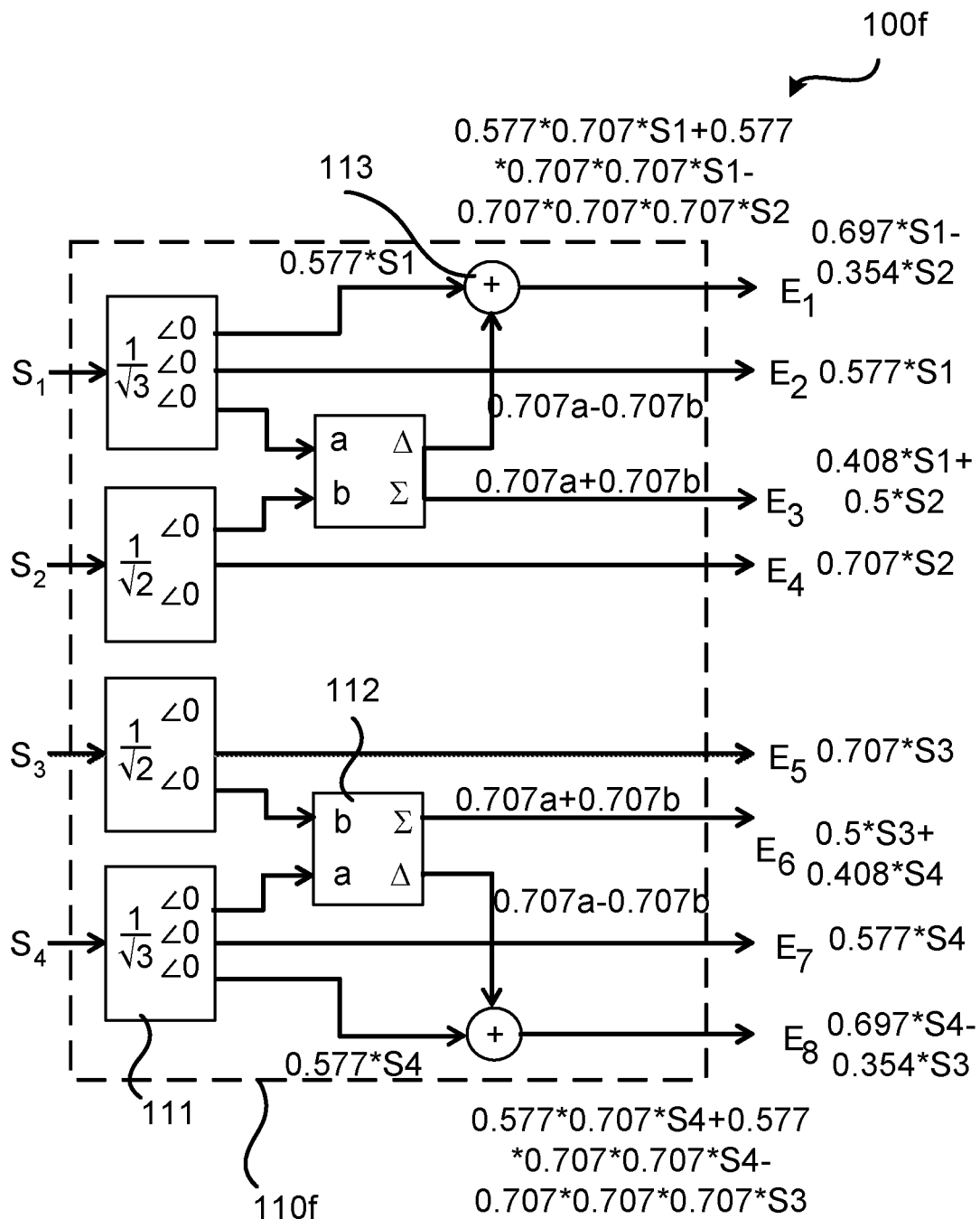

The embodiment of FIG. 8 represents a realization of a signal distribution network 110e in an antenna arrangement 100f having four inputs, as defined by baseband signals S1-S4 and eight antenna ports, as defined by antenna elements E1-E8. The signal distribution network 110f comprises four signal splitters 111, two signal combiners 112, and two signal adders 113. In terms of the signal splitters 111, the middle-most signal splitters have two outputs and the outer-most signal splitters have three outputs. Signal values at different stages of the signal distribution network 110f are also indicated. For example, $E4=S2/\sqrt{2}$.

Figure 9:
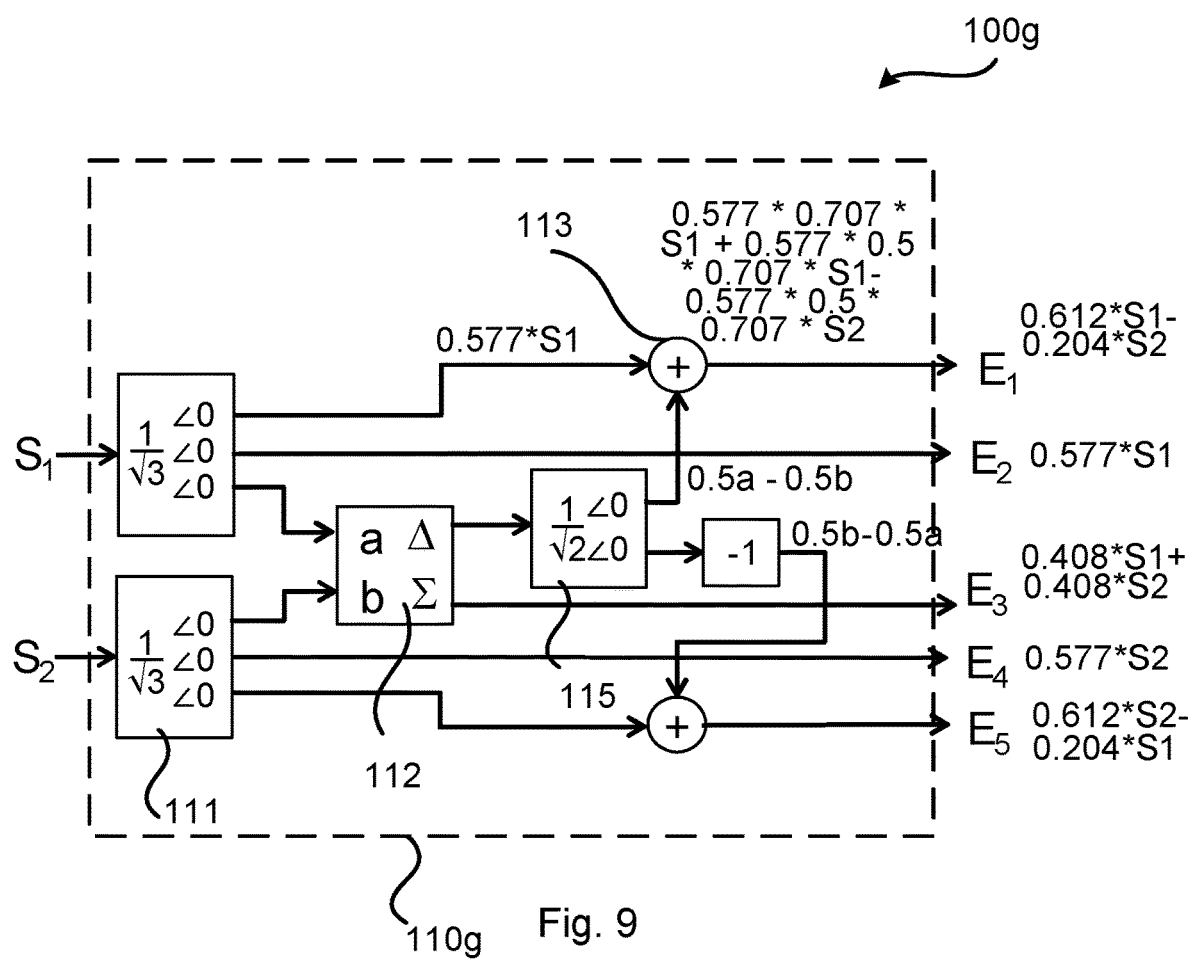

The embodiment of FIG. 9 represents a realization of a signal distribution network 110g in an antenna arrangement 100g having two inputs, as defined by baseband signals S1-S2 and five antenna ports, as defined by antenna elements E1-E5. The signal distribution network 110g comprises two signal splitters 111, one signal combiner 112, two signal adders 113, and one further signal splitter 115. Signal values at different stages of the signal distribution network 110g are also indicated.

Figure 10:
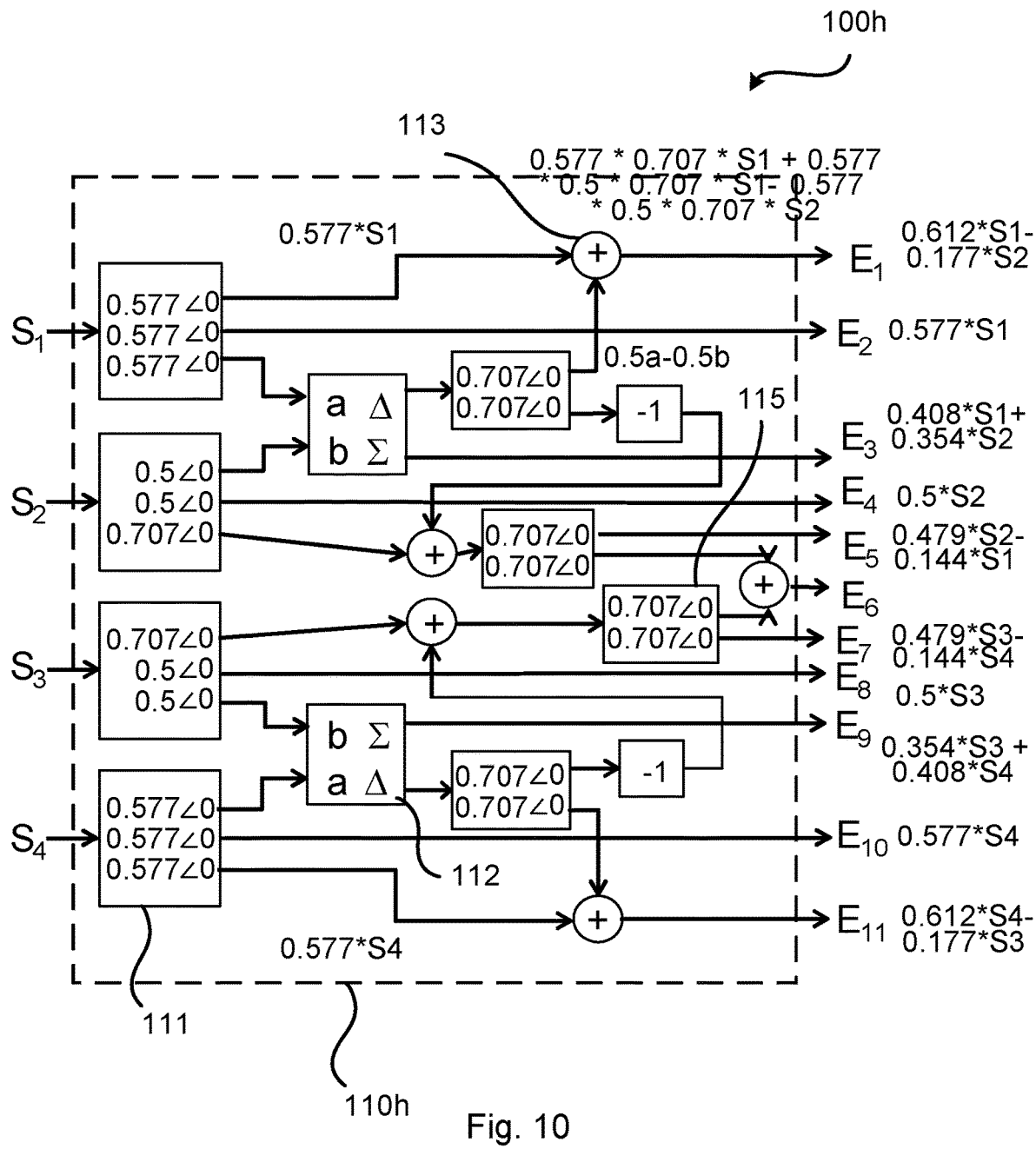
Figure 11:
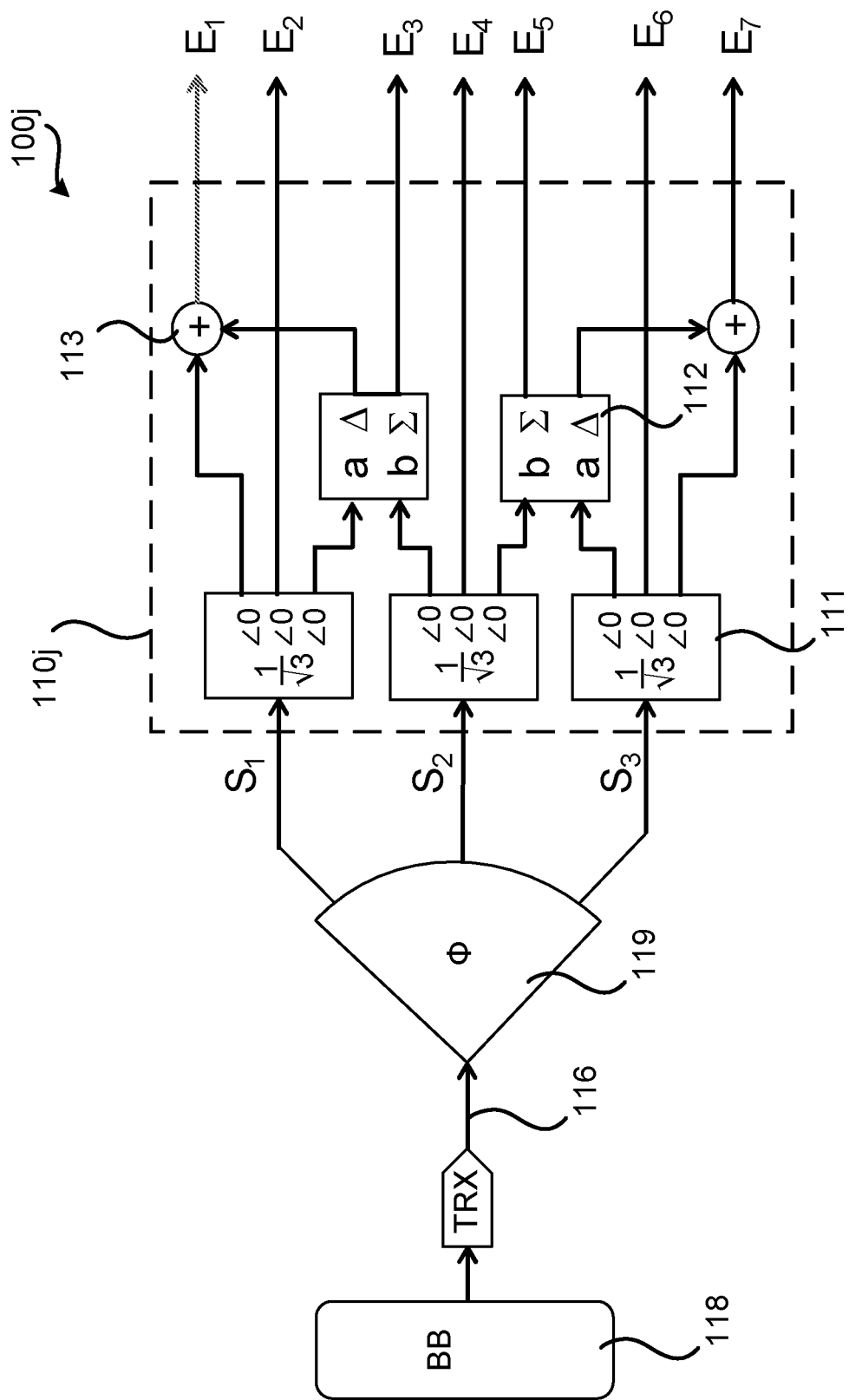

The embodiment of FIG. 10 represents a realization of a signal distribution network 110h in an antenna arrangement 100h having four inputs, as defined by baseband signals S1-S4 and eleven antenna ports, as defined by antenna elements E1-E11. The signal distribution network 110h comprises four signal splitters 111, two signal combiners 112, four signal adders 113, and four further signal splitters 115. In terms of the signal splitters 111, the two middle most signal splitters comprises amplitude tapering units (not shown in the figure) configured to scale one input baseband signal such that the individual outputs of one signal splitter have different amplitudes. Signal values at different stages of the signal distribution network 110g are also indicated The embodiment of FIG. 11 represents a realization of a signal distribution network 110j in an antenna arrangement 100j having three inputs, as defined by baseband signals S1-S3 and seven antenna ports, as defined by antenna elements E1-E7. All input baseband signals S1-S3 come from a common input baseband signal provided by a single transmitter chain 116. The common input baseband signal is split and phase shifted by a unit 119 to define the input baseband signals before the input baseband signals S1-S3 are fed to the three signal splitters 111. The input baseband signals originate from a baseband block 118 and share a common transmitter (TRX) along the single transmitter chain 116.

FIGS. 16(a) and 16(b) schematically illustrate amplitude (in dB) and phase (in degrees) as a function of element index for an antenna arrangement comprising a signal distribution network. The antenna arrangement comprises seven antenna elements and three input baseband signals. In FIGS. 16(a) and 16(b) each element index corresponds to one of the antenna elements. The signal distribution network is defined according to FIG. 6 where the input baseband signal S1, S2, and S3 additionally have been amplitude tapered as 0.707, 1 and 0.707, respectively, and where the element indices in FIGS. 16(a) and 16(b) corresponds to the odd numbered antenna elements in FIG. 6, i.e., E1, E3, E5, . . . , E13. FIGS. 16(a) and 16(b) represents four test cases, namely where the phase increments between S1, S2, and S3 is 0, 30, 60, and 90 degrees, respectively. These amplitude and phase conditions will in turn generate the seven antenna element signals which will have another amplitude and phase distribution, as illustrated in FIGS. 16(a) and 16(b).

Figure 16:
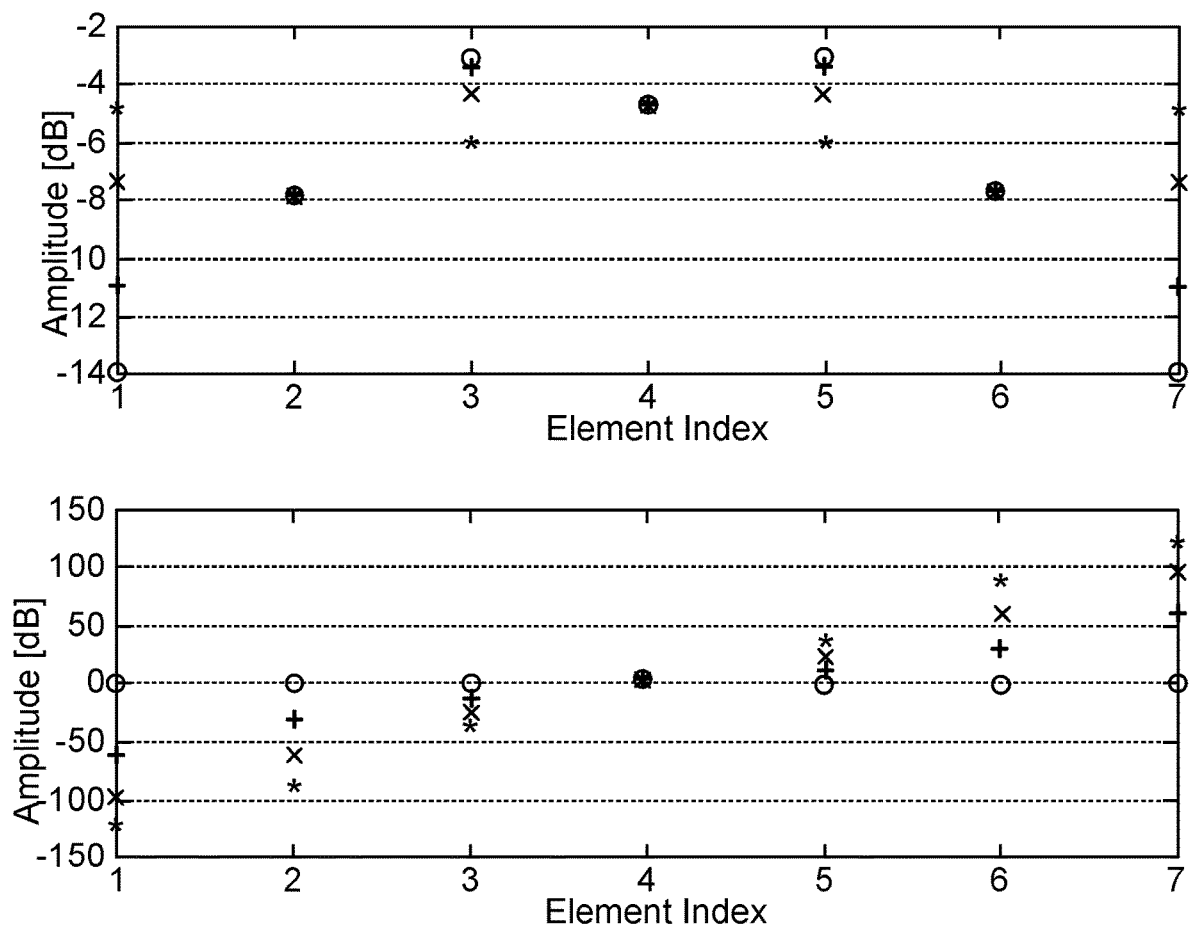
FIGS. 16, 17, and 18 show simulation results according to embodiments.
Figure 17:
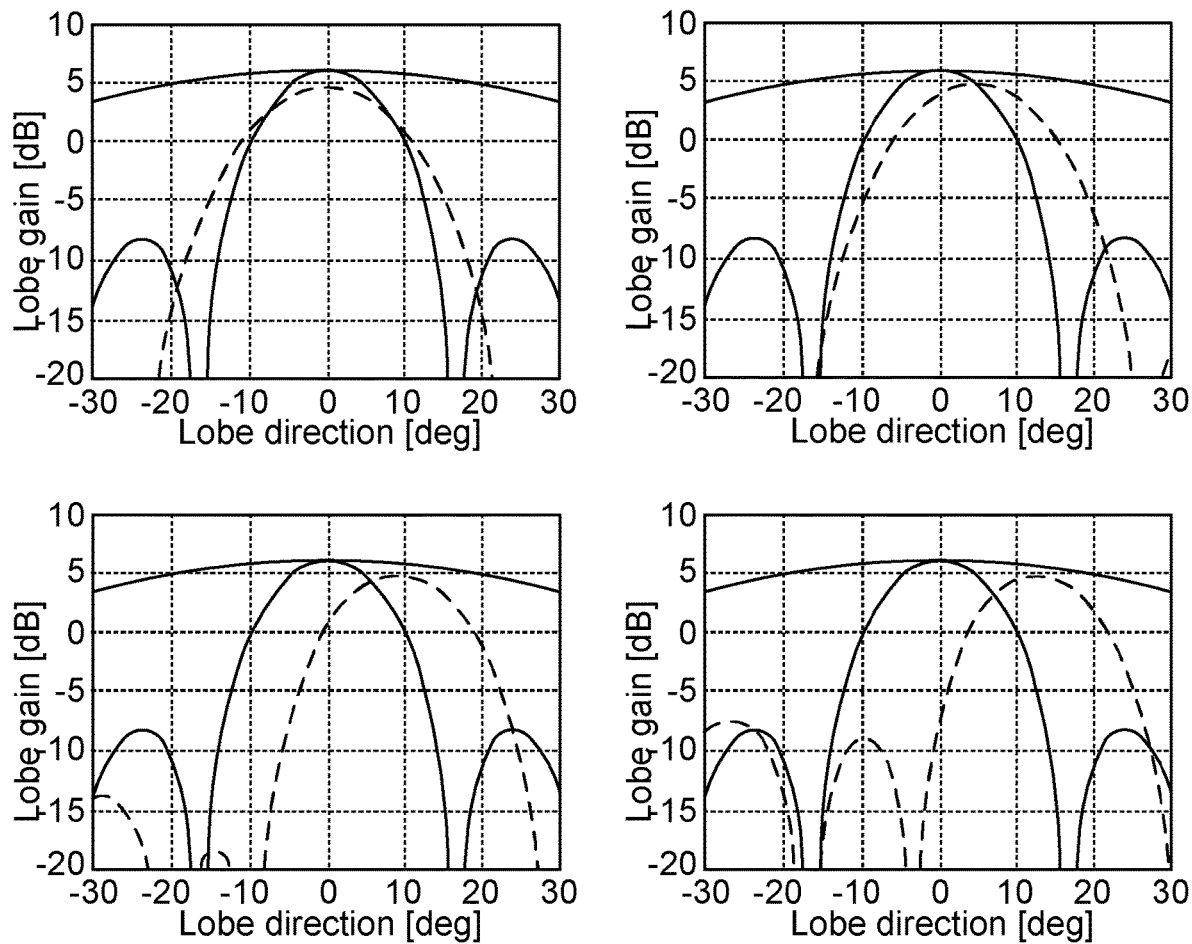

FIG. 17 schematically illustrates, in terms of antenna lobes as response to the stimuli used to obtain the simulation results in FIGS. 16(a) and 16 (b), a comparison between an antenna arrangement using the signal distribution network as in FIGS. 16(a) and 16(b) and a reference antenna arrangement using a one-to-one mapping between input baseband signals and antenna elements, i.e., where Ei=Si, for i=1, 2, . . . , 7.

Figure 18:
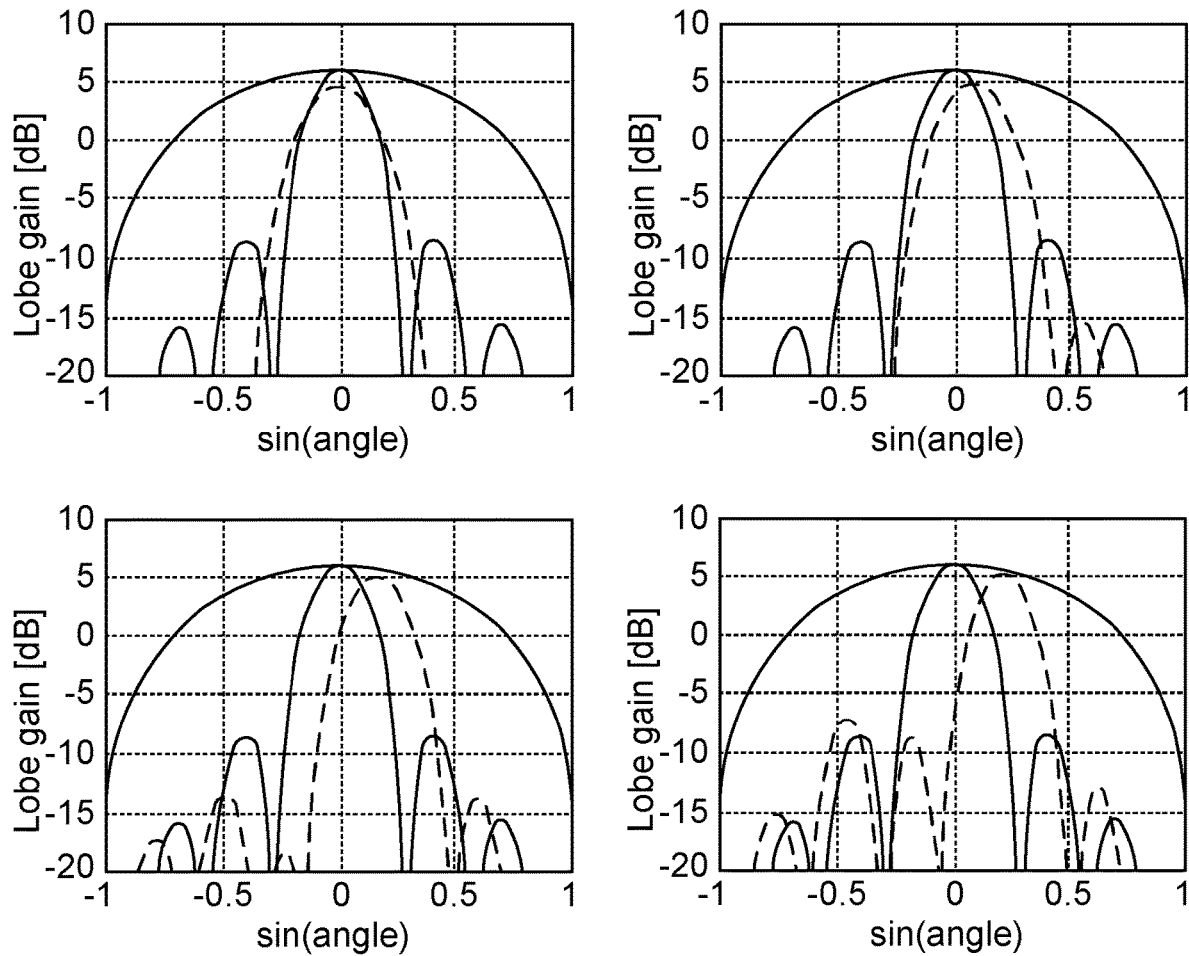

FIG. 18 schematically illustrates schematically illustrates, in terms of antenna lobes in sin(x) representation, where x represents the angle, as response to the stimuli used to obtain the simulation results in FIGS. 16(a) and 16 (b), a comparison between an antenna arrangement using the signal distribution network as in FIGS. 16(a) and 16(b) and the same reference antenna arrangement as in FIG. 17.

TABLE 1

Summary of simulation results in FIGS. 16, 17, and 18.
Table 1 summarizes the simulation results in FIGS. 16, 17, and 18.

| Sin phase inclination [deg] | Network loss [dB] | Max lobe gain [dB] | Max lobe direction [deg] | 10 dB angles [deg] | Side lobe level [dB] |
|---|---|---|---|---|---|
| 0 | 0.65 | 4.65 | 0 | −15.4/15.4 | −26 |
| 30 | 0.62 | 4.83 | 5.2 | −9.6/19.6 | −20 |
| 60 | 0.53 | 5.07 | 9.2 | −3.8/22.7 | −19 |
| 90 | 0.41 | 5.02 | 12 | 0.9/25.2 | −15 |
| 120 | 0.30 | 4.55 | 15.0 | 4.7/27.5 | −8 |

The inventive concept has mainly been described above with reference to a few embodiments. However, as is readily appreciated by a person skilled in the art, other embodiments than the ones disclosed above are equally possible within the scope of the inventive concept, as defined by the appended patent claims. For example, it is envisioned that other components, such as amplifiers, further phase shifters, further signal adders, further amplitude tampering units, further signal splitters, and further signal combiners, etc. may be added to any of the herein disclosed signal distribution networks 110a-110j. However, such other components, as well as the related functionality, of the signal distribution network 110a-110j are omitted in order not to obscure the concepts presented herein.

The invention claimed is:

1. A signal distribution network for an antenna arrangement with fewer input ports than antenna elements, comprising:
   at least two signal splitters; and
   at least one signal combiner,
   wherein each signal splitter is configured to receive one input baseband signal from a unique input port and to provide one direct feed signal as input to a unique antenna element, and to provide one intermediate signal as input to at least one of said at least one signal combiner,
   wherein all input baseband signals come from a common input baseband signal provided by a single transmitter chain, said common input baseband signal being split and phase shifted to define said input baseband signals before said input baseband signals are fed to said at least two signal splitters, and wherein each signal combiner is configured to receive two intermediate signals, each intermediate signal being received from a respective signal splitter of said at least two signal splitters, and to provide one combined signal as input to a unique antenna element, wherein said one combined signal is formed by combining the received two intermediate signals.

2. The signal distribution network of claim 1, wherein each signal splitter is configured to scale said direct feed signal and said intermediate signal with a first energy conservation factor.

3. The signal distribution network of claim 1, wherein each signal splitter is configured to scale said direct feed signal with one first energy conservation factor and said intermediate signal with another first energy conservation factor.

4. The signal distribution network of claim 1, wherein each signal combiner is configured to scale said combined signal with a second energy conservation factor.

5. The signal distribution network of claim 1, wherein each signal combiner is provided as a hybrid coupler having a sum output port and a difference output port, and wherein said combined signal is provided by said sum output port.

6. The signal distribution network of claim 1, comprising at least two signal combiners, and wherein each signal splitter is configured to provide intermediate signals as input to two of said at least two signal combiners.

7. The signal distribution network of claim 1, further comprising:
a signal adder configured to provide input to one antenna element of the antenna arrangement,
wherein one of said at least two combiners is configured to provide a first input to said signal adder, and wherein one of said at least one combiner is configured to provide a second input to said signal adder.

8. The signal distribution network of claim 7, wherein each signal combiner is provided as a hybrid coupler having a sum output port and a difference output port, and wherein said second input is provided by said difference output port of said one of said at least one combiner.

9. The signal distribution network of claim 1, further comprising:
an amplitude tapering unit configured to scale one input baseband signal and to provide said scaled one input baseband signal to one of said at least two signal splitters.

10. The signal distribution network of claim 1, further comprising:
a further signal splitter configured to split said input to one of said antenna elements into two inputs, and to feed said two inputs to unique antenna elements.

11. The signal distribution network of claim 1, wherein there is a linear phase increment between the input baseband signals to adjacent ones of the at least two signal splitters.

12. The signal distribution network of claim 1, wherein each input baseband signal has its own individual transmitter chain.

13. The signal distribution network of claim 1, wherein the signal distribution network is configured to receive N input baseband signals and to provide inputs to 2N−1 antenna elements.

14. The signal distribution network of claim 1, wherein the signal distribution network is configured to receive N input baseband signals and to provide inputs to 2N antenna elements.

15. The signal distribution network of claim 1, wherein the signal distribution network is configured to receive N input baseband signals and to provide inputs to 2N+1 antenna elements.

16. An antenna arrangement comprising the signal distribution network of claim 1.

17. A network node comprising the signal distribution network of claim 1.

18. A wireless terminal comprising the signal distribution network of claim 1.

19. A method for processing signals in a signal distribution network for an antenna arrangement with fewer input ports than antenna elements, the signal distribution network comprising at least two signal splitters and at least one signal combiner, the method comprising:
receiving, by each signal splitter, one input baseband signal from a unique input port;
providing, by each signal splitter, one direct feed signal as input to a unique antenna element, and providing one intermediate signal as input to at least one of said at least one signal combiner,
wherein all input baseband signals come from a common input baseband signal provided by a single transmitter chain, said common input baseband signal being split and phase shifted to define said input baseband signals before said input baseband signals are fed to said at least two signal splitters;
receiving, by each signal combiner, two intermediate signals, each intermediate signal being received from a respective signal splitter of said at least two signal splitters; and
providing, by each signal combiner, one combined signal as input to a unique antenna element, wherein said one combined signal is formed by combining the received two intermediate signals.

20. A non-transitory computer-readable medium comprising, stored thereupon, a computer program product for processing signals in a signal distribution network for an antenna arrangement with fewer input ports than antenna elements, the signal distribution network comprising at least two signal splitters and at least one signal combiner, the computer program product comprising a computer program that, when executed by the signal distribution network, causes the signal distribution network to:
receive, by each signal splitter, one input baseband signal from a unique input port;
provide, by each signal splitter, one direct feed signal as input to a unique antenna element, and provide one intermediate signal as input to at least one of said at least one signal combiner,
wherein all input baseband signals come from a common input baseband signal provided by a single transmitter chain, said common input baseband signal being split and phase shifted to define said input baseband signals before said input baseband signals are fed to said at least two signal splitters;
receive, by each signal combiner, two intermediate signals, each intermediate signal being received from a respective signal splitter of said at least two signal splitters; and provide, by each signal combiner, one combined signal as input to a unique antenna element, wherein said one combined signal is formed by combining the received two intermediate signals.

* * * * *